United States Patent
Simmons et al.

(10) Patent No.: US 11,745,130 B2
(45) Date of Patent: Sep. 5, 2023

(54) FILTER KIT, ASSEMBLY, AND METHOD FOR INSTALLATION WITHIN A SUPPORT SURFACE ASSOCIATED WITH A HEAT EXCHANGER UNIT NOT LIMITED TO SUCH AS AN AIR COOLED LIQUID CHILLER

(71) Applicant: The Newway Company, West Chester, OH (US)

(72) Inventors: Randy Simmons, West Chester, OH (US); John Gordon Grenville, Abingdon (GB); Steven George Bell, Berkshire (GB)

(73) Assignee: THE NEWWAY COMPANY, West Chester, OH (US)

( * ) Notice: Subject to any disclaimer, the term of this patent is extended or adjusted under 35 U.S.C. 154(b) by 301 days.

(21) Appl. No.: 17/189,680

(22) Filed: Mar. 2, 2021

(65) Prior Publication Data
US 2021/0275952 A1 Sep. 9, 2021

Related U.S. Application Data

(60) Provisional application No. 62/984,472, filed on Mar. 3, 2020.

(51) Int. Cl.
*B01D 46/00* (2022.01)
*B01D 46/10* (2006.01)

(52) U.S. Cl.
CPC ....... *B01D 46/001* (2013.01); *B01D 46/0005* (2013.01); *B01D 46/10* (2013.01)

(58) Field of Classification Search
CPC ...... B01D 46/00; B01D 46/10; B01D 46/001; B01D 46/0005
(Continued)

(56) References Cited

U.S. PATENT DOCUMENTS

| 3,866,380 A | 2/1975 | Benson |
| 3,955,702 A | 5/1976 | Lundy |

(Continued)

FOREIGN PATENT DOCUMENTS

| CN | 209639221 U | 11/2019 |
| JP | 2010-236442 A | 10/2010 |
| KR | 10-2003-0038032 A | 5/2003 |

OTHER PUBLICATIONS

International Search Report and Written Opinion issued by the Korean Intellectual Property Office acting as International Searching Authority for International Patent Application No. PCT/US2021/020584 dated Jun. 18, 2021 (9 pages in total).

*Primary Examiner* — Minh Chau T Pham
(74) *Attorney, Agent, or Firm* — Dinsmore & Shohl LLP

(57) ABSTRACT

A filter and kit assembly for securing to one or more intake surfaces associated with a V-shaped heat exchanger unit. A screen includes a reinforced edge, within which is configured a plurality of spaced apart grommets aligning with and receiving therethrough engaging portions of the fasteners. In one variant, a frame is constructed for supporting the fasteners and attached filter and which is subsequently secured by clips against a flange surface surrounding the intake opening. In a further variant, the screen is configured in wrap-around fashion for supporting against first and second consecutively arranged intake openings along with an interconnecting intermediate flange surface.

13 Claims, 15 Drawing Sheets

(58) Field of Classification Search
USPC ...... 55/385.1, 496, 500, 502, 511, 525, 490,
55/491, 495, 501, DIG. 31; 62/259.1,
62/262, 507
See application file for complete search history.

(56) References Cited

U.S. PATENT DOCUMENTS

| | | | |
|---|---|---|---|
| 4,519,823 A | 5/1985 | Kinney, Jr. et al. | |
| 4,600,419 A | 7/1986 | Mattison | |
| 5,080,699 A * | 1/1992 | Ho | F24F 8/108 |
| | | | 55/495 |
| 5,364,458 A * | 11/1994 | Burnett | B03C 3/155 |
| | | | 96/68 |
| 5,525,136 A * | 6/1996 | Rosen | B01D 39/083 |
| | | | 55/DIG. 39 |
| 5,547,011 A | 8/1996 | Dotson et al. | |
| 5,899,027 A | 5/1999 | St. Louis | |
| 6,007,596 A * | 12/1999 | Rosen | B01D 46/0002 |
| | | | 55/491 |
| 6,197,077 B1 | 3/2001 | Simmons et al. | |
| 6,294,004 B1 * | 9/2001 | Summers | B01D 46/0032 |
| | | | 55/DIG. 12 |
| 6,361,578 B1 * | 3/2002 | Rubinson | B01D 46/12 |
| | | | 55/DIG. 35 |
| 6,444,003 B1 * | 9/2002 | Sutcliffe | B01D 46/58 |
| | | | 55/482 |
| 6,464,745 B2 | 10/2002 | Rivera et al. | |
| 6,793,715 B1 * | 9/2004 | Sandberg | B01D 46/10 |
| | | | 55/501 |
| 6,902,603 B2 * | 6/2005 | Wiser, III | B01D 46/10 |
| | | | 55/506 |
| 6,918,940 B1 | 7/2005 | Lackey et al. | |
| 6,959,748 B2 | 11/2005 | Hudoba | |
| 7,323,028 B2 | 1/2008 | Simmons | |
| 7,387,654 B1 * | 6/2008 | Byers | B01D 46/10 |
| | | | 55/501 |
| 9,561,456 B2 | 2/2017 | Simmons | |
| 9,827,522 B2 | 11/2017 | Simmons | |
| 10,040,149 B2 | 8/2018 | Simmons | |
| 2004/0154242 A1 | 8/2004 | Hudoba et al. | |
| 2008/0098702 A1 * | 5/2008 | Simmons | F24F 1/56 |
| | | | 55/471 |
| 2010/0014688 A1 | 1/2010 | Mollon | |
| 2014/0096494 A1 * | 4/2014 | Wiser, III | B01D 46/0002 |
| | | | 55/502 |
| 2015/0375152 A1 * | 12/2015 | Simmons | B01D 46/0005 |
| | | | 55/491 |

\* cited by examiner

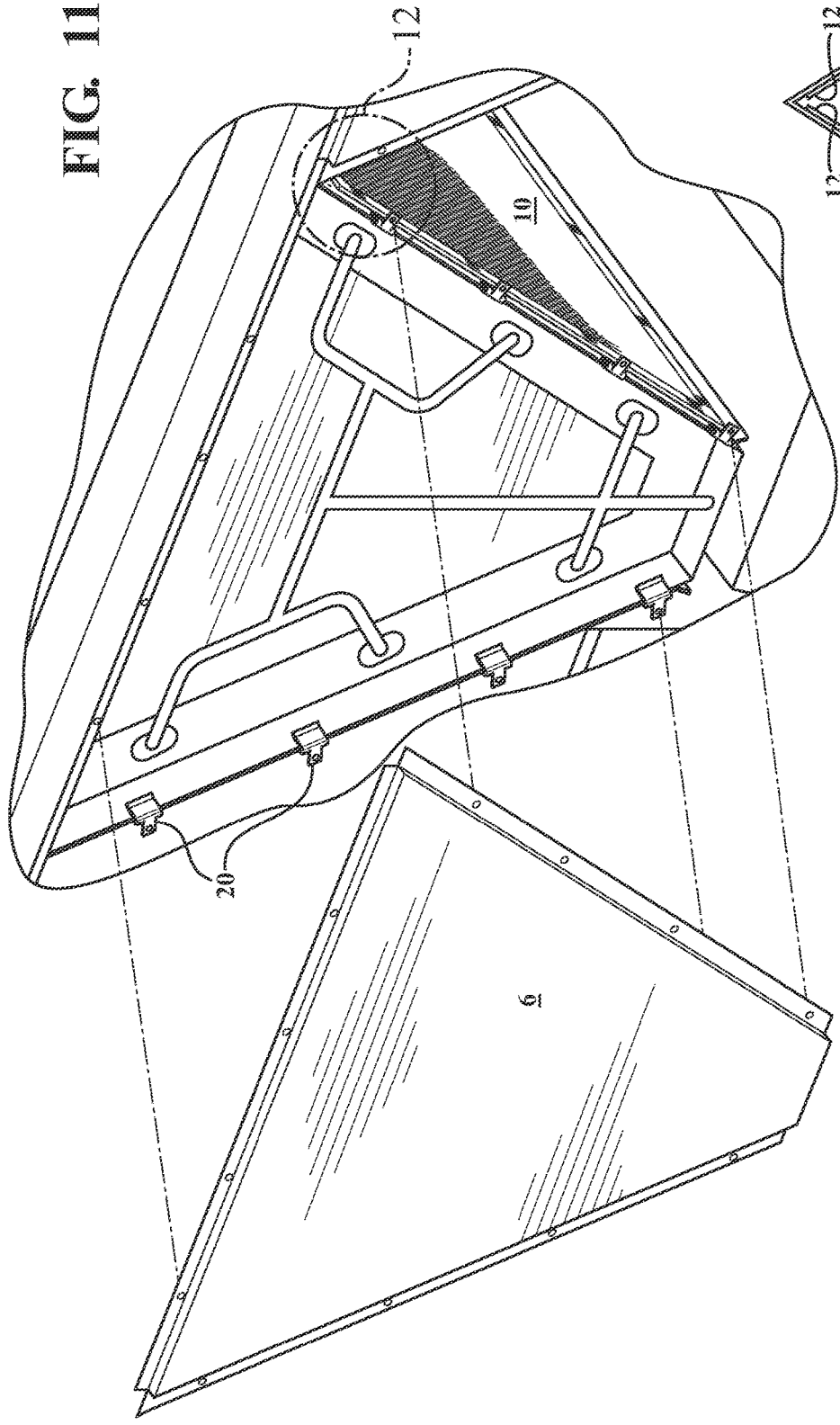

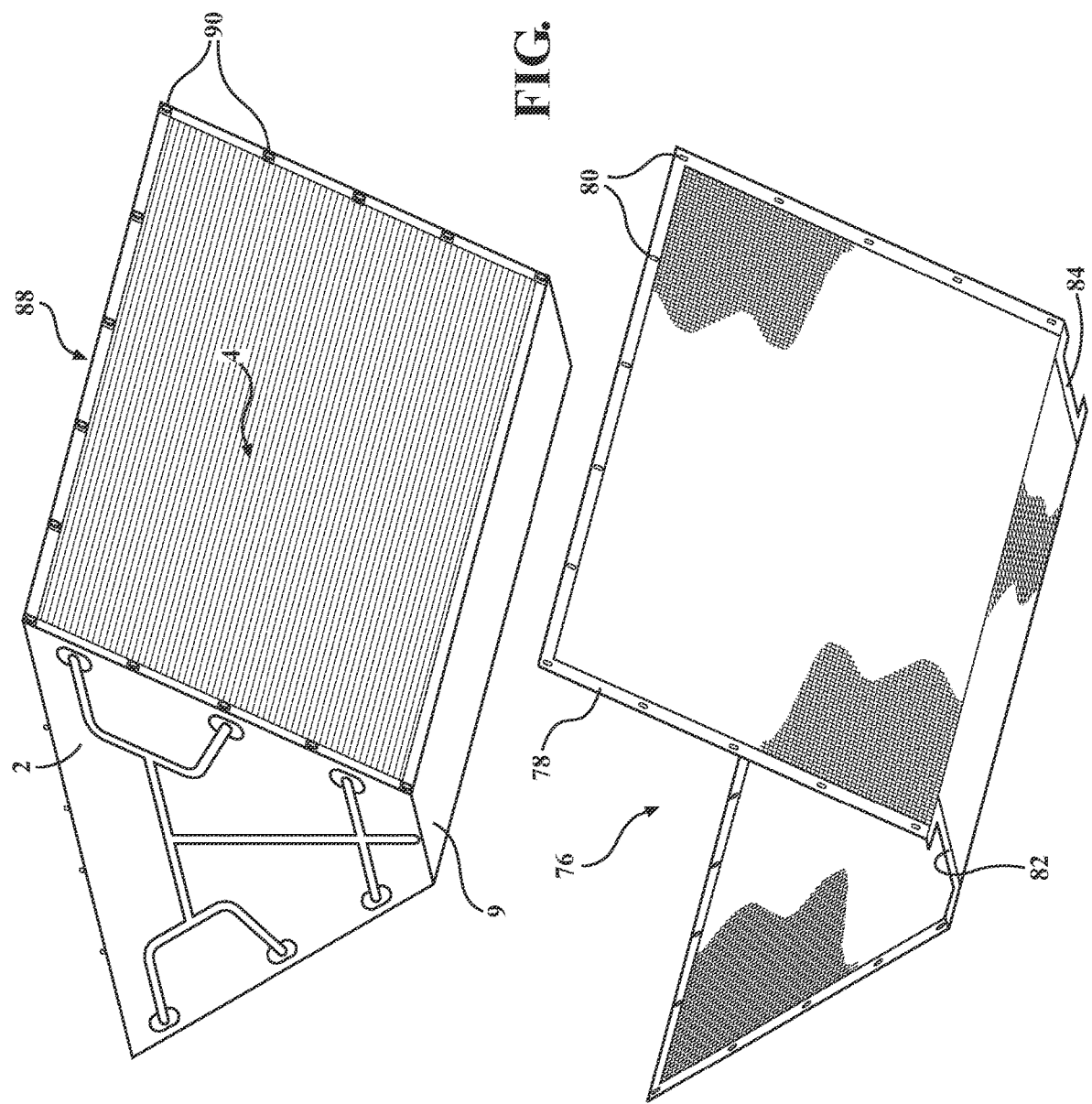

FILTER KIT, ASSEMBLY, AND METHOD FOR INSTALLATION WITHIN A SUPPORT SURFACE ASSOCIATED WITH A HEAT EXCHANGER UNIT NOT LIMITED TO SUCH AS AN AIR COOLED LIQUID CHILLER

CROSS REFERENCE TO RELATED APPLICATIONS

The present application claims the priority of U.S. Ser. No. 62/984,472 filed Mar. 3, 2020.

FIELD OF THE INVENTION

The present invention relates generally to a filter assembly and related kit for securing to an air handling unit of any type or configuration. More specifically, the present invention discloses a filter assembly and kit for attachment to an inner face associated with a V shaped air cooled liquid chiller assembly, and which provides for effective filtration and without damage to the sensitive coils during either installation or servicing. The present invention further provides for mounting of multiple assemblies against the angular oriented surfaces within the V shaped chiller assemblies, with the respective screen supporting perimeter tracks and backing frames being dimensioned to accommodate tight corner tolerances, in particular at an apex triangular corner for receiving opposing arrayed and angled edges of a pair of respective assemblies mounted to successive coil assemblies.

Other variants include integrating multiple angled filters into a one-piece wrap around configuration of the screen. The screen can include intermediate opposite edge cutouts for accommodating the varying geometries of the chiller equipment. Other variants include the use of channel tracks and insertable twist/toggle lock fasteners for mounting the wrap around filter to the angled sides of the V chiller. Additional variants include the ability to mount the wrap-around filter directly to the angled chiller faces via the twist or toggle lock fasteners which are adhesively pre-mounted to the chiller intake faces surrounding the openings.

BACKGROUND OF THE INVENTION

The prior art is documented with examples of filter assemblies which can be secured to an intake face of any type of air handling or other type of unit not limited to a chiller or HVAC type appliance. A challenge in the existing art is in providing for effective filtration for such as the angled (⌊V⌋ shaped) intake surfaces associated with an air-cooled liquid chiller. These challenges include the difficulty and relative inaccessibility of the ⌊V⌋ coil surfaces over which the filtration screens are required to be positioned and secured as well as the tight tolerances, such as associated with a triangular apex corner edge location, which is involved with mounting a pair of angled screens and perimeter extending tracks and backing frames within opposing angled coil surfaces.

SUMMARY OF THE PRESENT INVENTION

The present invention discloses a filter and kit assembly for securing to a heat exchanger unit having a four sided assemblable frame, each of the sides exhibiting a thin planar cross section. A four sided track secured to and includes an open forward slot within which are supported a plurality of fasteners.

A screen approximating in dimension an outline of the four sided track includes a reinforced edge, within which is configured a plurality of spaced apart grommets aligning with and receiving therethrough engaging portions of the fasteners extending through the slot to secure the screen to the track and frame. Upon positioning the thin planar frame against an outer flange surface surrounding a heat exchanger opening of the unit, a plurality of clips are adapted to engage aligning edges of the frame and flange surface in order to secure the frame, track and screen in place over the heat exchanger opening.

The heat exchanger unit further includes an air cooled liquid chiller unit having coil arrays associated with the heat exchanger openings which are arrayed in an opposing ‖V‖ configuration. A plurality of clamps are provided for temporarily securing together the aligning edges of the frame and intake opening prior to installation of the clips. The sides of the frame further includes overlapping apertures which, upon inter-assembly of the tracks, align to permit installation of additional engagement fasteners. The engagement fasteners further comprising rivets.

Other features include integrating multiple angled filters into a one-piece wrap around configuration of the screen. The screen can include intermediate opposite edge cutouts for accommodating the varying geometries of the chiller equipment. Other variants include the use of channel tracks and insertable twist/toggle lock fasteners for mounting the wrap around filter to the angled sides of the V chiller. The wrap-around filter can also be directly mounted to the angled chiller faces, via the twist or toggle lock fasteners which are adhesively or magnetically pre-mounted to the chiller intake faces surrounding the openings.

BRIEF DESCRIPTION OF THE DRAWINGS

Reference will now be made to the attached drawings, when read in combination with the following detailed description, wherein like reference numerals refer to like parts throughout the several views, and in which:

FIG. 11 illustrates and end-step reattachment of the end cap to the "V" chiller;

FIG. 12 is an enlarged view of an apex triangular corner of FIG. 11 and showing the ability to accommodate the dimensioning of the flat planar frame and attached tracks of a pair of assemblies angularly secured for covering adjoining chiller coil openings;

FIG. 13 is an exploded view of a one-piece wrap around configuration of the filter screen applied to a V chiller frame, the screen including intermediate opposite edge cutouts for accommodating varying geometries of the chiller equipment;

DETAILED DESCRIPTION OF THE PREFERRED EMBODIMENTS

With reference to the attached drawings, the present invention discloses a filter assembly and related kit for securing to any type of air handling unit such as in particular a heat exchanger. More specifically, the present invention discloses a filter assembly and kit for attachment to an angled intake associated with a V chiller assembly, and which provides for effective filtration and without damage to the coils during either installation or servicing. The present invention further provides for mounting of multiple assemblies against the angular surfaces within the V shaped heat exchangers, with the respective screen supporting perimeter tracks and backing frames being dimensioned to accommodate tight corner tolerances, in particular at an apex triangular corner for receiving angled edges of a pair of respective assemblies mounted to successive and inter-angled heat exchangers.

Figure 1:
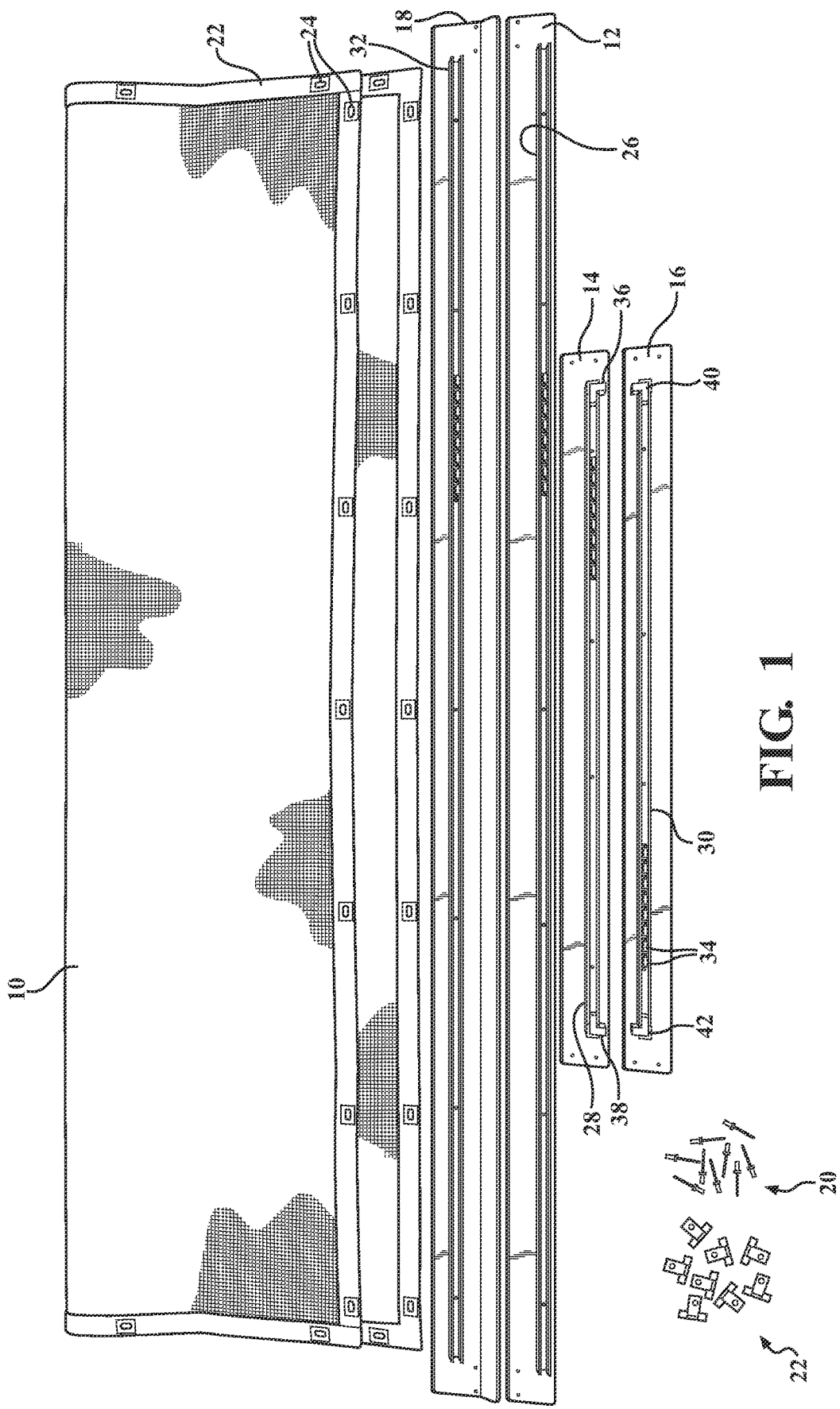
FIG. 1 is an assembly view of the kit components of the filter assembly of the present invention and showing each of the screen, four piece track and supporting frame, rivet fasteners and edge support clips.

With reference to FIG. 1, an assembly view of the kit components of the filter assembly according to a first non-limiting embodiment of the present invention is generally shown and includes each of the screen, four piece track and supporting frame including top component 12, side components 14/16 and bottom component 18 (this further exhibiting an angled profile as shown). Additional components include rivet fasteners 20 (for securing overlapping frame end locations) and edge support clips 22 (for securing the assembled frame to the flange surrounding the coil array).

The screen 10 can include any grade mesh or filtration medium and typically also includes an outer reinforcing edge 22 within which is further configured a plurality of spaced part grommets 24. Without limitation, the screen can further include any flexible or rigid construction.

The frame components 12-18 each exhibit a flat planar construction and can include any rigid material construction. Individual sections of track, at 26, 38, 30 and 32 for corresponding frame components 12, 14, 16 and 18, are depicted and likewise can be constructed of any rigid material such as steel or aluminum. The track sections are mounted to the surfaces of the flattened frame components, and are ideally pre-mounted (such as by screws or rivets) to the frame components prior to being transported to the assembly site.

The tracks each exhibit a generally "U" shape construction with an open forward slot or opening. The tracks each seat an individual plurality of fasteners (such as depicted at 34 for selected bottom track 30). The fasteners 34 can be provided in a variety of types and can include such as twist lock, toggle lock or other fastener configurations and such that each fastener can be positioned at a location along the track, with a portion of each fastener projects through the open slot and forward of the exterior adjoining surface of the track.

Figure 2:
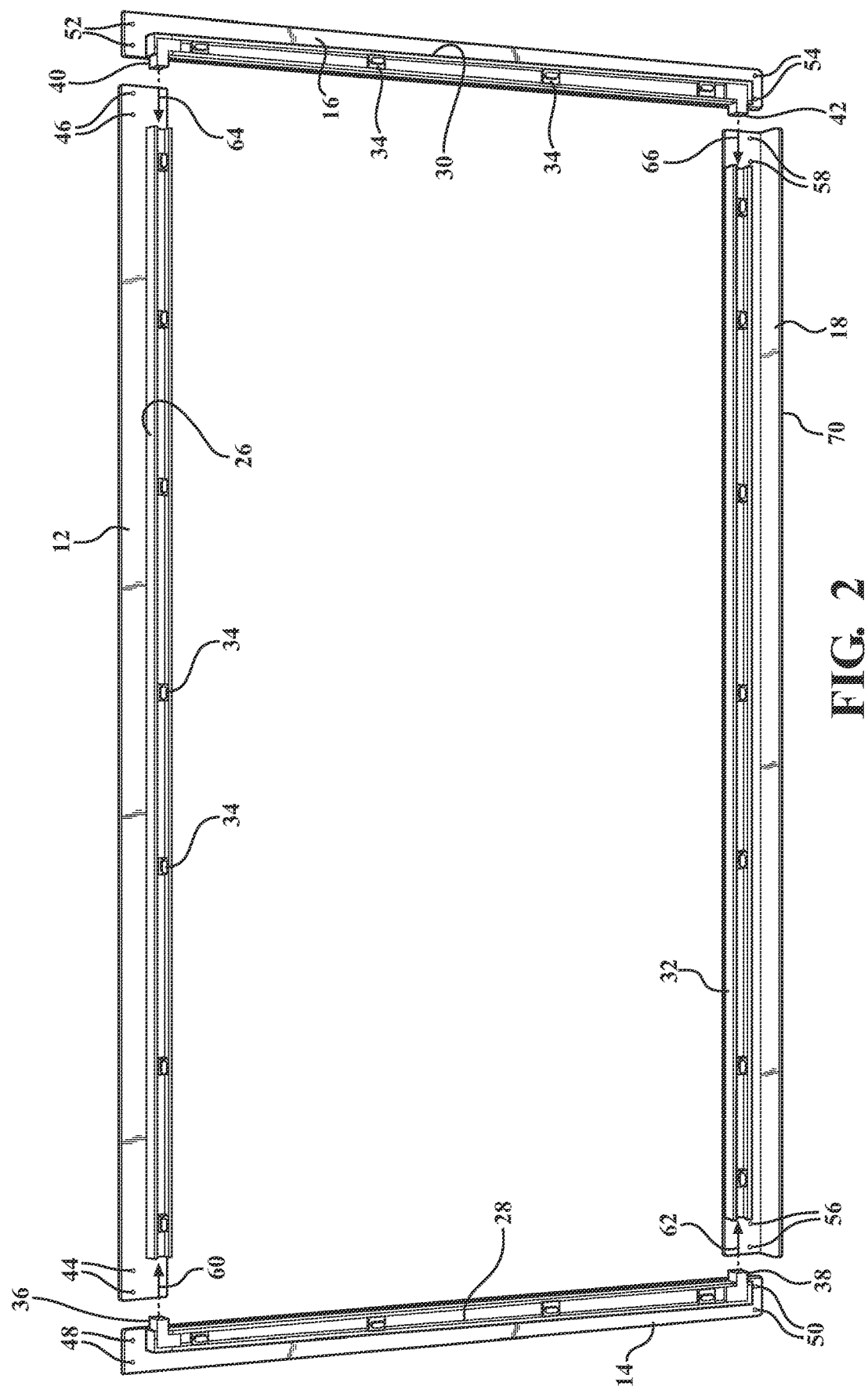
FIG. 2 is a succeeding view to FIG. 1 and depicting the orientation of the combined frame and track components prior to inter-assembly.

Proceeding to FIG. 2, a succeeding view to FIG. 1 is shown and depicts the orientation of the combined frame and track components prior to inter-assembly. Corner connectors ("L" shaped) are shown which are attached to opposite ends of each side frame supported track (see as shown at 36/38 for side component mounted track 28 and further at 40/42 for opposite side component mounted track 30).

Each of the flattened and elongated frame components further include pre-formed apertures (see pairs at opposite ends of each component as identified by aperture pairs 44 and 46 at opposite ends of top frame component 12, pairs 48 and 50 at opposite ends of side frame component 14, pairs 52 and 54 at opposite ends of side frame component 16 and pairs 56 and 58 at opposite ends of bottom frame component 18. Initial installation of the frame is accomplished by inter-assembling the top 12 and side 14/16 components. This can (without limitation) also be facilitated by numbering or marking the end overlapping locations of the frames in order to ensure correct orientation.

Figure 5:
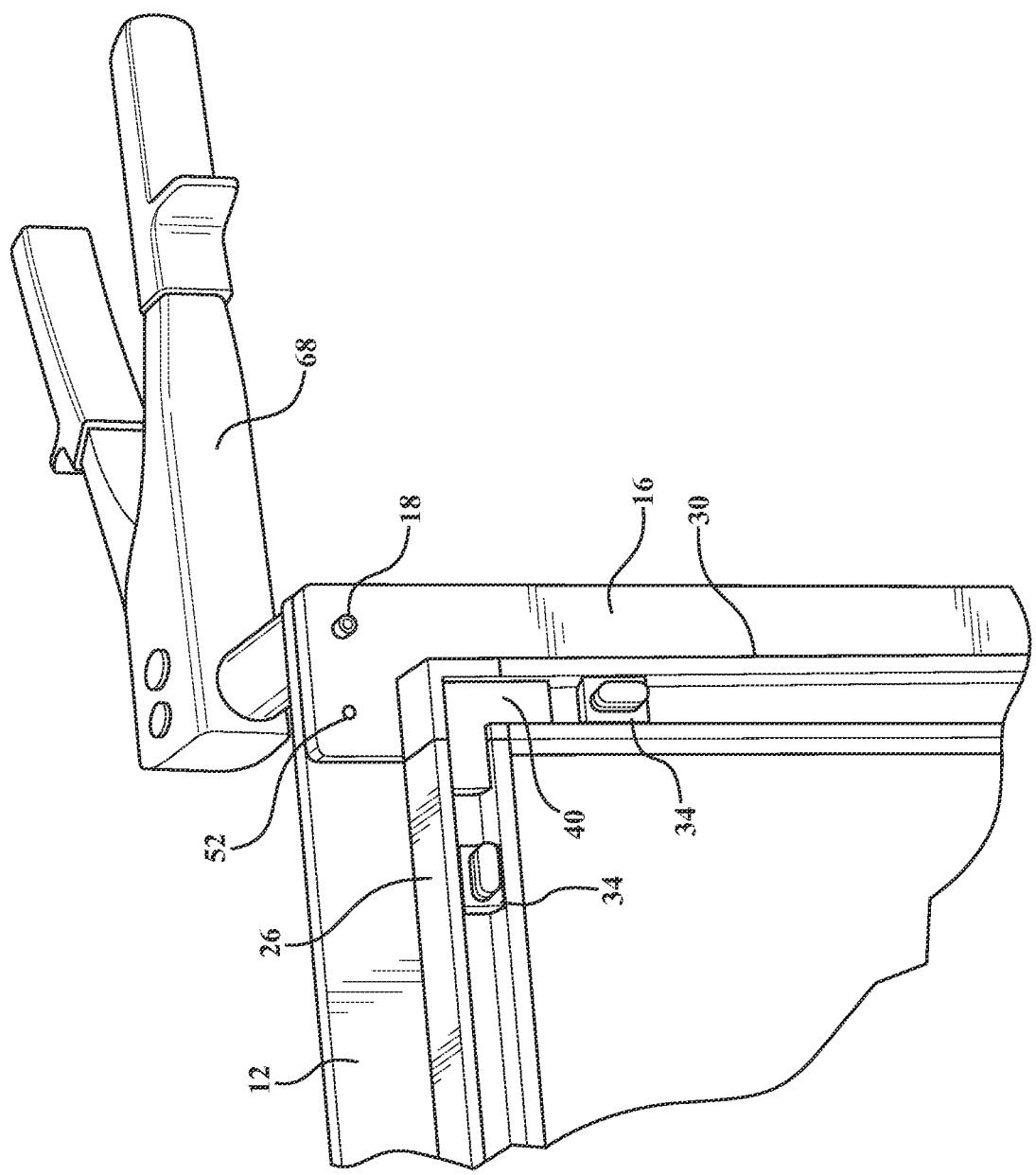
FIG. 5 is an illustration of a rivet engagement step for securing overlapping thin planar edge locations of the frame components.

Assembly is facilitated by installing the projecting portions of each the corner connectors 36-42 into an opposing open end of an aligning track section which has been previously affixed to its frame component, such being facilitated by tapping with a hammer to resistively engage the projecting portion of each corner connector in the direction shown by arrows 60-66 into a resistive fitting engagement within the open interior of the succeeding track section. Upon installation, the overlapping pairs of apertures (44 to 48, 46 to 52, 50 to 56 and 54 to 58) at each overlapping end of the four side assembled frame are caused to be in alignment for subsequent installation of the screw fasteners which can include, without limitation, the mounting rivets 18. To this end, a rivet tool 68 (FIG. 5) can be employed for securing the individual frame sections together. In alternate variants, use of separate engagement fasteners (rivets or otherwise) can be avoided by reconfiguring the individual frame components with any type of interlocking or inter-engaging structure configured at the overlapping edge locations.

Upon inter-assembling the top 12 and side 14/16 frame components, the "U" shaped structure is rotated to assemble the bottom component 18 in similar fashion and so that its angled bottom (see angled edge at 70 in FIG. 2) extends downwardly at an acute angle (in one instance not limited to twenty degrees) in order to accommodate the bottom of the heat exchanger coil and surrounding support flange).

Figure 3:
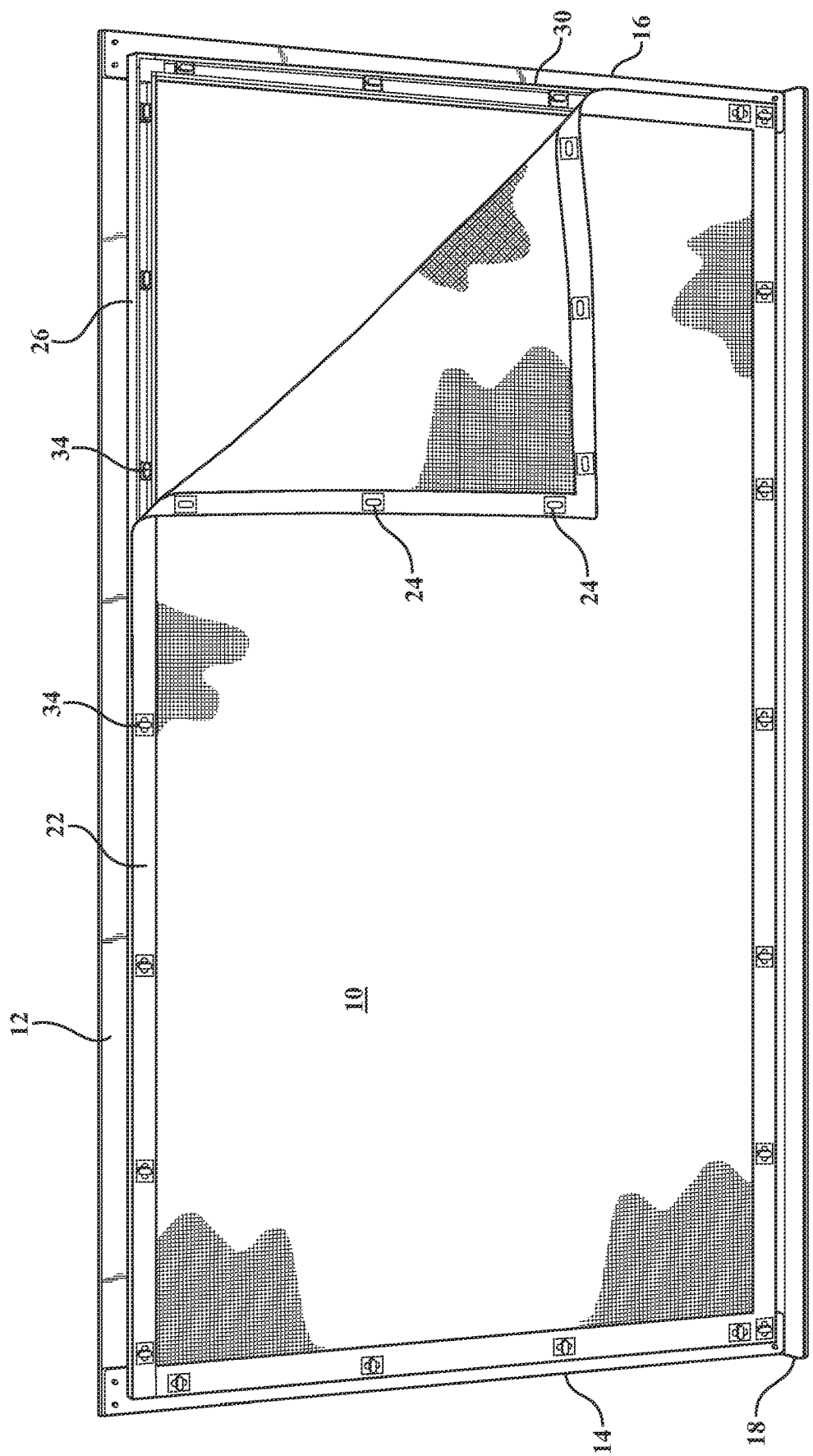
FIG. 3 is a succeeding illustration depicting the screen and reinforced edge with grommets for mounting to the track supported fasteners.
Figure 4:
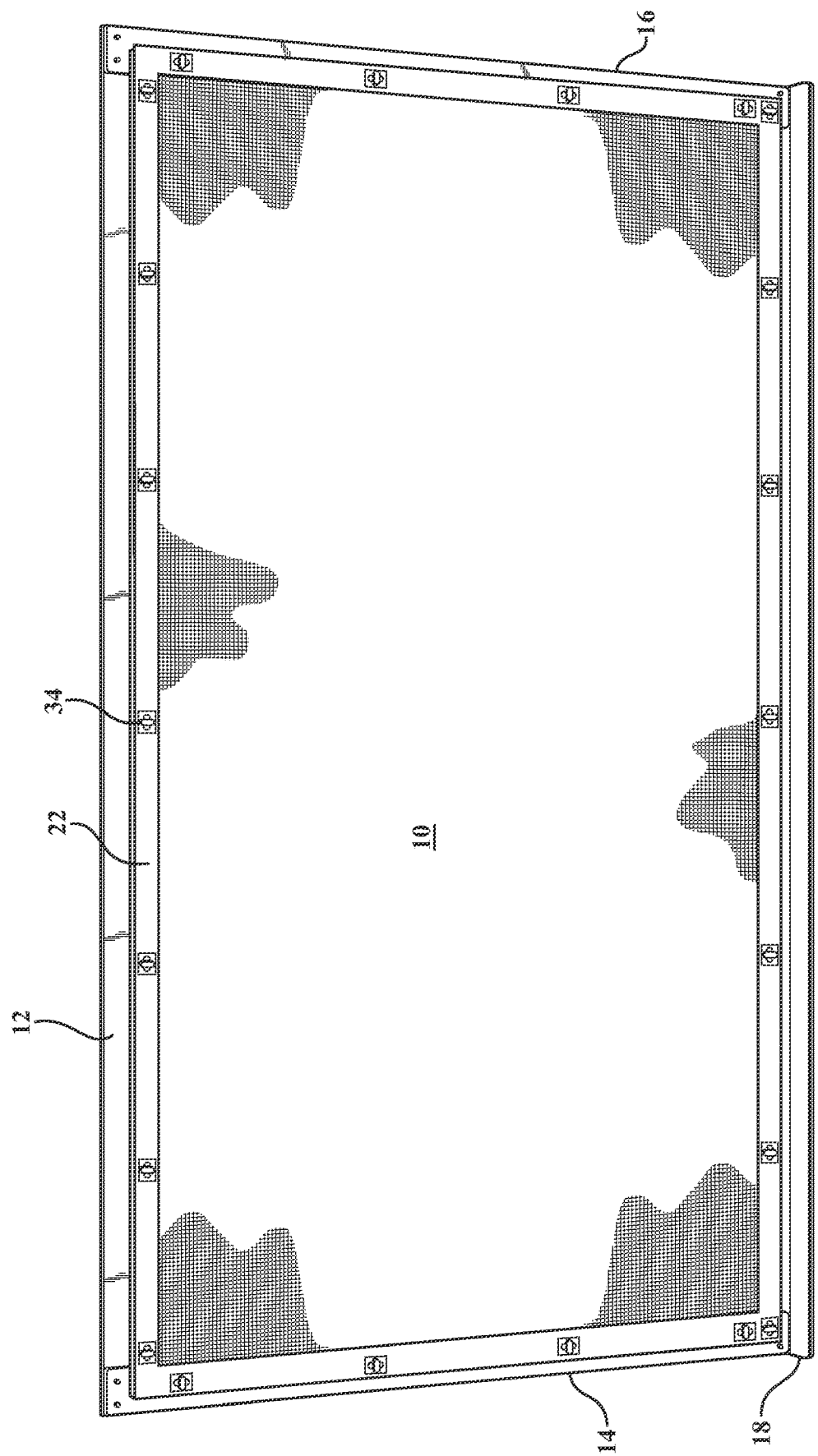
FIG. 4 succeeds FIG. 3 and depicts the completed attachment of the screen to the track and frame.

FIG. 3 is a succeeding illustration depicting the screen 10 and reinforced edge 22 with grommets 24 for mounting to the track supported fasteners 34, these again depicted by twist lock fasteners arranged at spaced apart intervals within the respective sections of track 28-32. In a non-limiting installation application, the fasteners 34 can be pre-positioned into the tracks to align with the grommets 24 located in the screen outer perimeter 22. This can include the fasteners being loosely displaced into pre-position relative to the screen grommets and, following rotational installation of the projecting twist lock portions being slightly readjusted within the track in order to tauten the screen 10. FIG. 4 succeeds FIG. 3 and depicts the completed attachment of the screen 10 to the individual sections of track and outer supporting frame.

Figure 6:
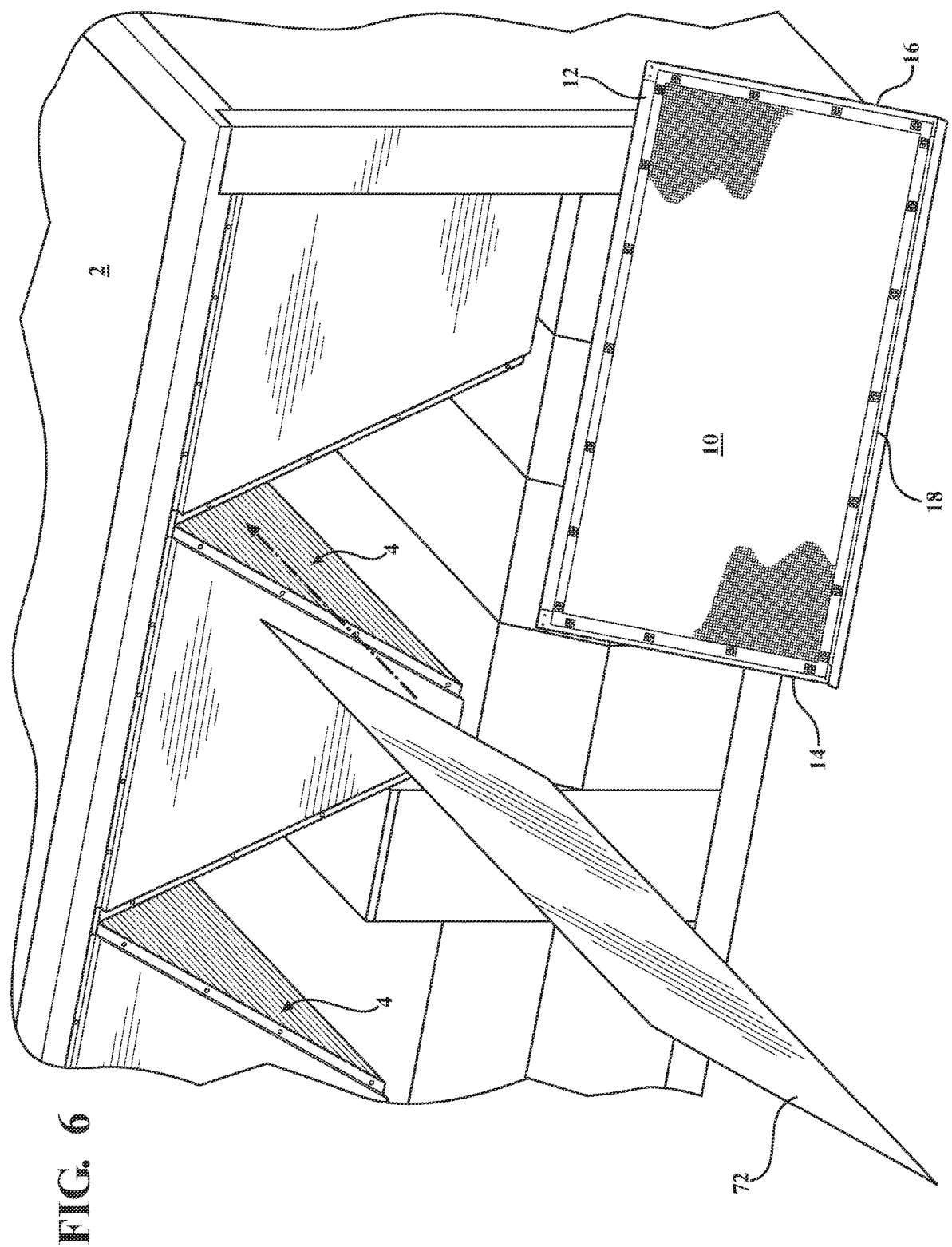
FIG. 6 is an environmental illustration of a ‖V‖ chiller assembly and depicting a protective layer approximating the dimensions of the frame which is pre-placed within the chiller interior over a selected coil surface prior to installation of the assembled frame, track and screen.

Proceeding to FIG. 6 is an environmental illustration of a conventional ‖V‖ chiller assembly 2 and depicting a protective layer 72 approximating the dimensions of the assembled frame of FIG. 4. The protective layer 72 can, without limitation, include any corrugated or other semi-rigid or rigid material not limited to heavy duty paperboard or other material. The protective layer 72 is further shown pre-placed within the chiller interior over a selected coil surface and prior to installation of the assembled frame, track and screen. This is further depicted by inner angularly oriented heat exchanger areas 4 as shown. Without limitation, temporary adhesives such as duct tape or the like can be used to secure the protective sheet 72 over the heat exchanger opening and in order to shield the liquid coils of the chiller during installation of the previously assembled frame.

Figure 7:
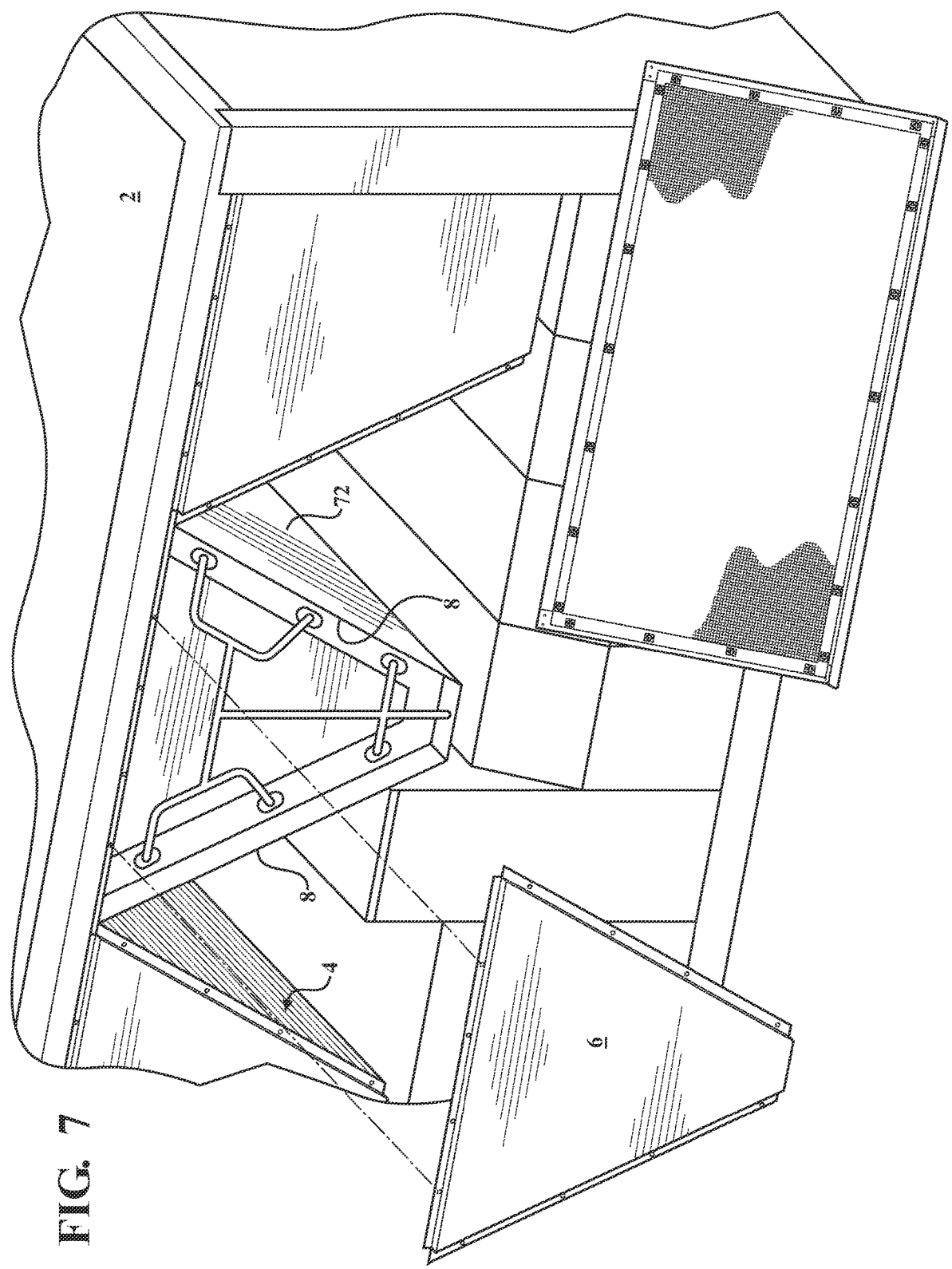
FIG. 7 illustrates removal of an end cap portion of the ⌊V⌋ chiller following temporary installation of the protective screen.
Figure 8:
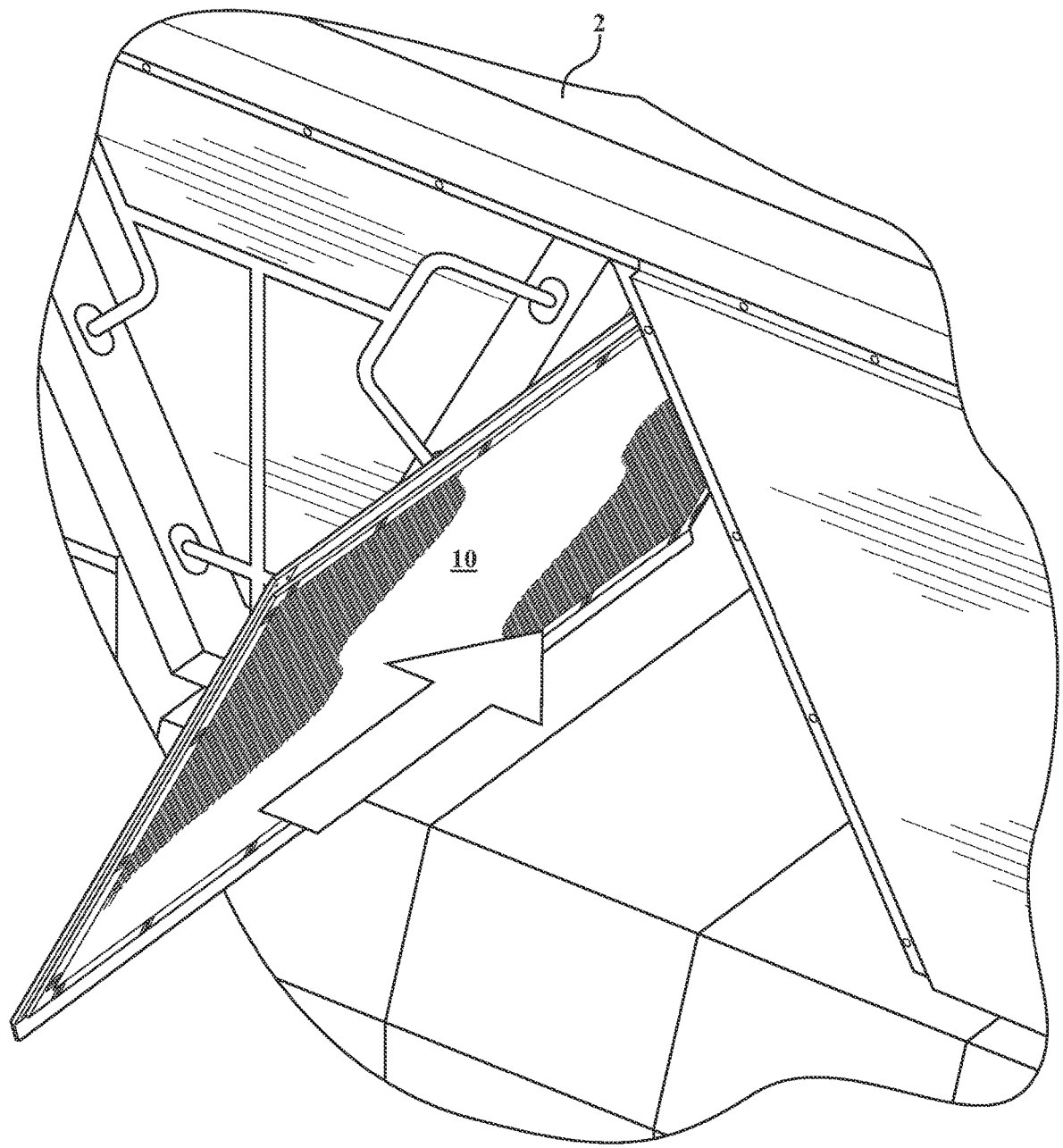
FIG. 8 is a subsequent slide⌋ in installation view of the frame, track and screen.
Figure 9:
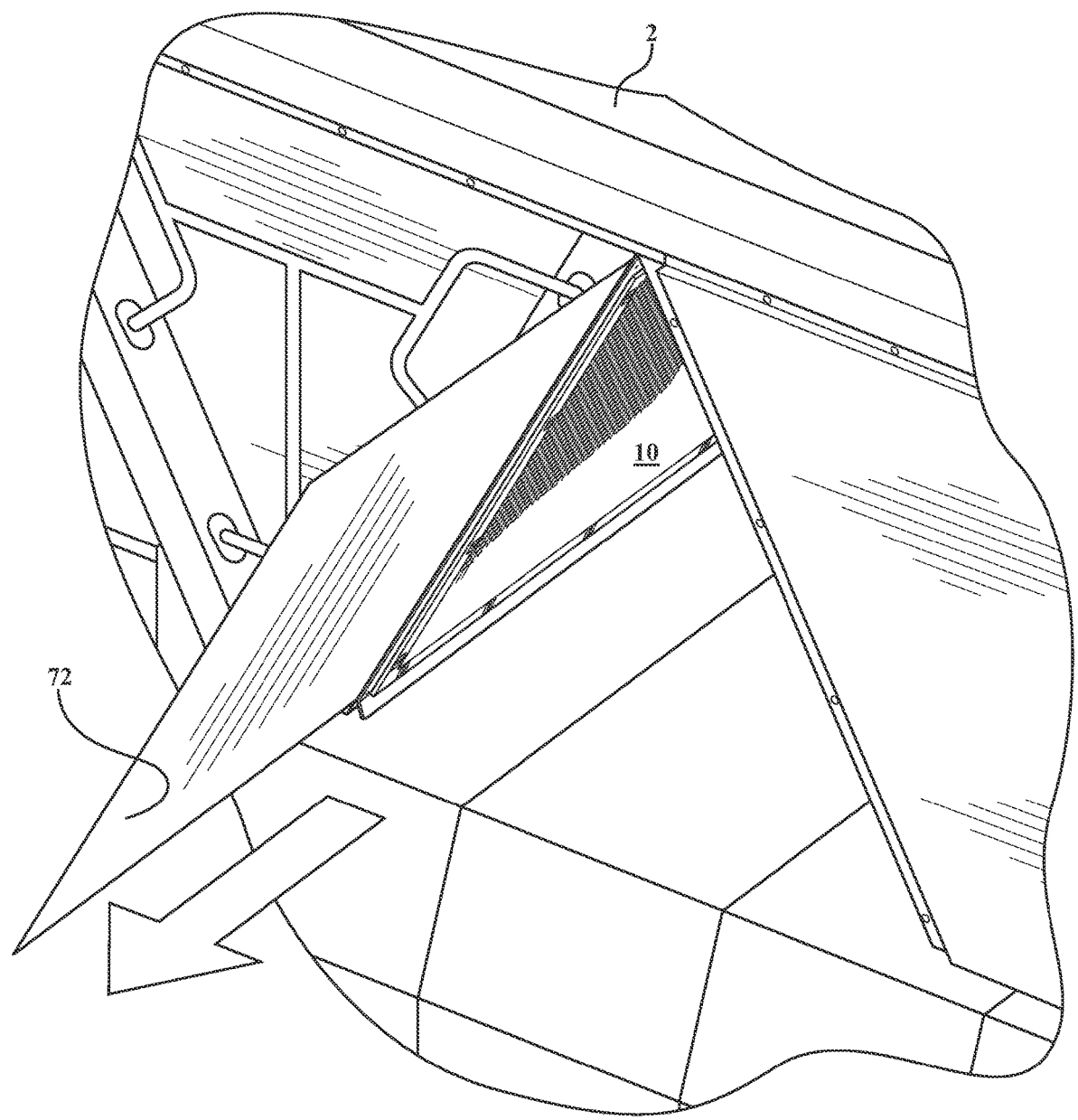
FIG. 9 succeeds FIG. 8 and depicts the removal of the protective sheet upon installation of the frame, track and screen.

FIG. 7 illustrates removal of an end cap portion 6 of the ⁐V⁐ chiller following temporary installation of the protective layer 72 and to reveal an outer flange 8 associated with each heat exchanger opening, such permitting subsequent installation of the screen. FIG. 8 is a subsequent slide‖ in installation view of the assembled frame, track and screen (the protective layer preventing accidental puncturing of the sensitive coils by the edges of the frame). FIG. 9 succeeds FIG. 8 and depicts the removal of the protective sheet 72 upon installation of the frame, track and screen.

Figure 10:
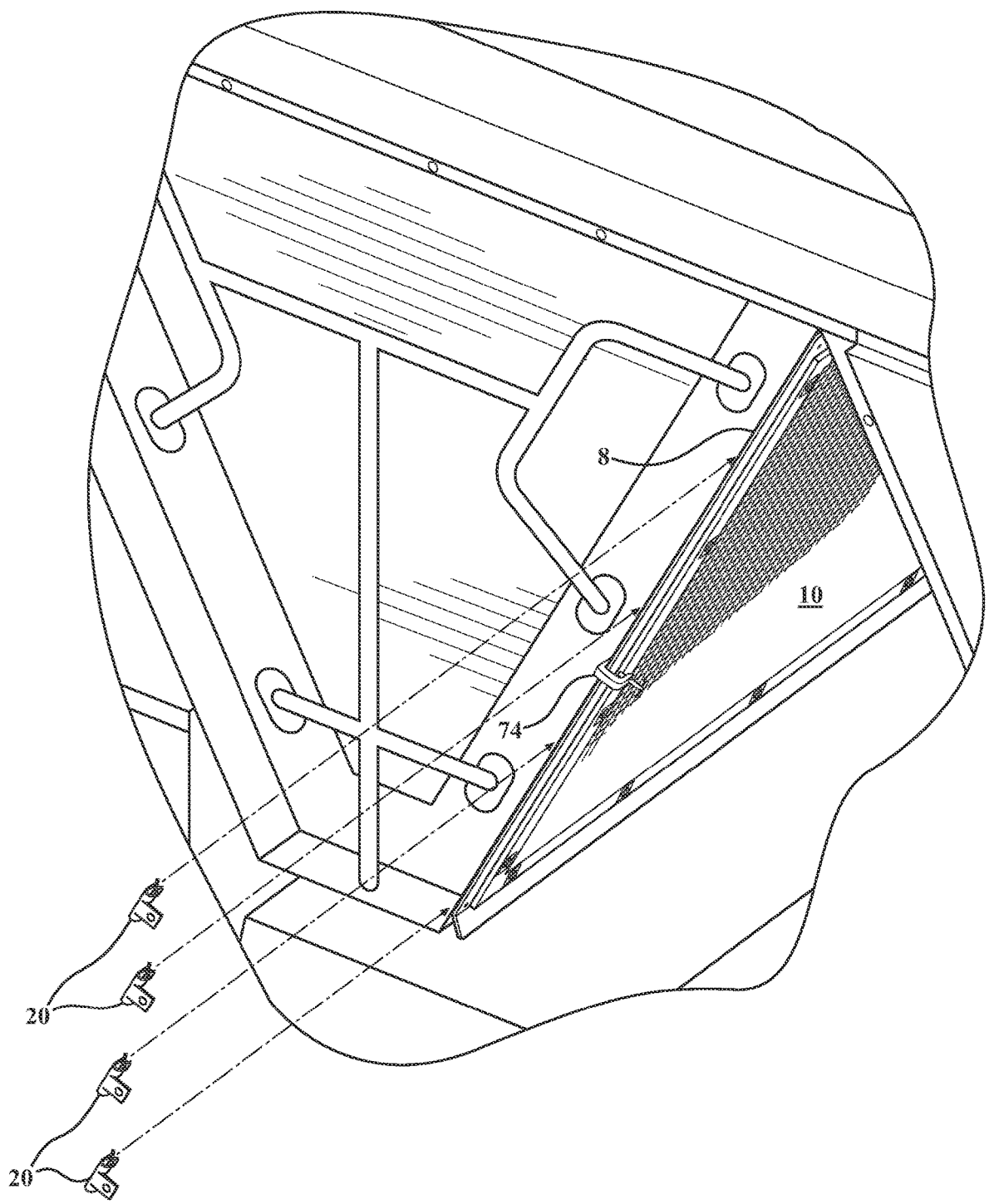
FIG. 10 succeeds FIG. 9 and depicts the application of temporary clamps to overlapping edge locations of the frame and surrounding intake surface of the chiller coil opening, following which clips are installed for permanently securing the frame, track and screen in place.

FIG. 10 succeeds FIG. 9 and depicts the application of temporary clamps (see G clamps at 74) to overlapping edge locations of the frame and surrounding intake flange surface 8 of the heat exchanger opening, following which the clips 20 are installed for permanently securing the frame, track and screen in place and the temporary G clamps 74 then removed. Typically, any number of clips 20 such as four per side as shown are installed per side in an evenly spaced fashion and can be done by soft tapping of a hammer (not shown) in order to sandwich the clip edges around the edges of the frame side components 14/16 and the supporting flange locations 8 of the chiller assembly 2.

FIG. 11 illustrates and end-step reattachment of the corner or end caps (see at 6) to the ‖V‖ chiller side fascia locations, and which can be accomplished with the use of a suitable socket tool with an attachable bit matching the head of the conventional bolt or similar style fastener which secures the covering 6 to the chiller assembly.

FIG. 12 is an enlarged side view of an apex triangular corner of FIG. 11 and which is provided for showing the ability to accommodate the dimensioning of the flat planar frame components (shown by top edge extending frame components 12 for each frame with inwardly spaced tracks 26). The present invention contemplates attaching the tracks 26, and in particular those associated with the top frame components, inwardly spaced from the upper most frame edge in order to accommodate the minimal clearances associated with the upper apex corner and so that a pair of individual frame, track and screen assemblies as shown can be angularly secured for covering adjoining heat exchanger chiller coil openings associated with the ⁐V⁐ configuration.

Proceeding now to FIG. 13, an exploded view is shown of a one-piece wrap around configuration of the filter screen (generally shown at 76) applied to first and second consecutively arranged and angled intake faces the V chiller frame 2. The filter screen, as previously described, again includes any type of mesh or like construction with a reinforced extending outer perimeter edge 78 and perimeter spaced apertures 80 (grommet reinforced or other), and is further dimensioned to approximate a combined surface area represented by the outermost rectangular dimension of the intake face illustrated at 4 in FIG. 13, along with a bottom flange surface 9, this corresponding to an intermediate interconnecting surface of the chiller 2, as well as a reverse facing intake face (hidden from view) which generally corresponds to that shown. Without limitation, the filter screen can be further reconfigured to extend across any number of succeeding and inter-angled intake faces.

The wrap-around screen 76 as shown also includes any type of intermediate opposite edge cutouts, these depicted in non-limiting example by ⁐U⁐ shaped intermediate opposite edge cutout profiles 82 and 84 defined at bottom angled side facing portions of the screen corresponding in location to the underside contacting flange surface 9 of the chiller assembly 2. The screen 76 configuration is modified, as needed, in order to accommodate varying geometries of the chiller equipment and so that the wraparound filter screen maintains a smooth surface profile when installed within the heat exchanger.

Figure 14:
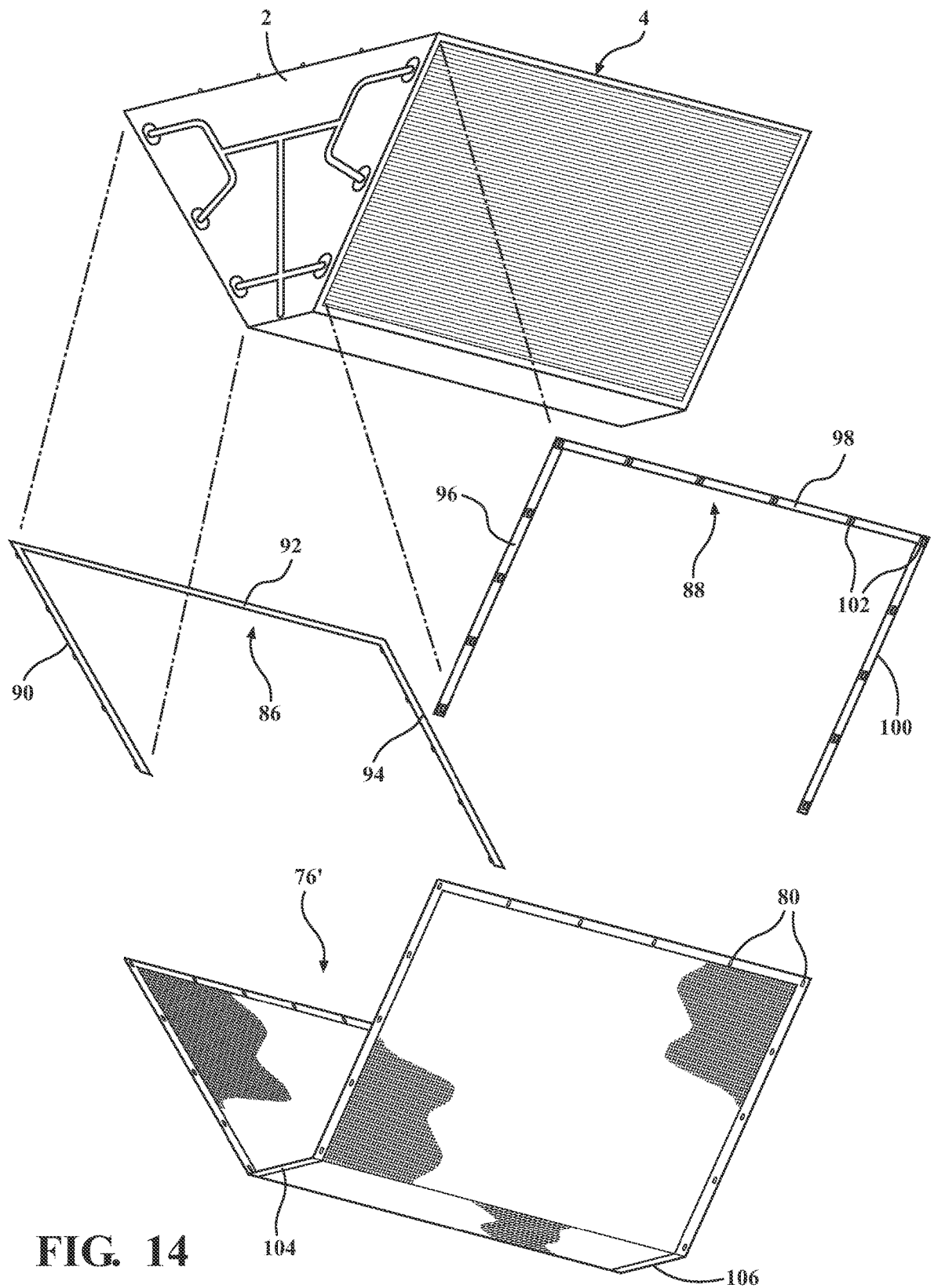
FIG. 14 is a further exploded view of the variant of FIG. 13 and depicting first and second "U" shaped channel track sub-assemblies for mounting to the first and second angled faces of the V chiller frame.

FIG. 14 is a further exploded view of the variant of FIG. 13 and depicting first and second ⁐U⁐ shaped channel track sub-assemblies for mounting to the first and second angled faces of the V chiller frame 2. The subassemblies are both depicted generally at 86 and 88 and each includes three individual and interconnected lengths (see at 90, 92 and 94 for first subassembly 86 and further at 96, 98 and 100 for second subassembly 86), and which align with the angled sides and upper most interconnecting horizontal edges of the V chiller 2. Without limitation, the interconnecting sides of the track subassemblies 86 and 88 can be secured together, including with the use of rivets or the like as previously described.

Selected U track 88 is depicted mounted to the V chiller frame 2 in FIG. 13 and further includes perimeter spaced twist or toggle lock fasteners 102, and which can without further limitation be supported within open channel interiors of each track section according to any length adjustable fashion. Alternatively, the U shaped channel or track sections can be reconfigured at supporting rails, over which the screen grommet engaging fasteners can be exteriorly and displace-ably mounted in order to slide along the exterior of the redesigned rails, and then locked in place to engage a specified grommet defining aperture located at a reinforced edge proximate location of the mesh screen.

Without limitation, the U shaped track subassemblies 86 and 88 can be mounted to the exterior faces of the V chiller fascia, again using screws, rivets or the like. A variant of the wraparound screen is further shown at 76U and, as compared to 76 in FIG. 13, can include any redesign to accommodate installation within the chiller (such further in this instance including a smooth edge profile at intermediate underside locations 104 and 106 corresponding to the underside cutouts 82/84 shown in the variant 76 of the wraparound screen in FIG. 13. Other features include mounting the tracks or individual fasteners utilizing any of screws, magnets or adhesives. Although not shown, hook and loop fasteners can also be utilized for either mounting the wraparound filter 76 directly to the V chiller intake faces 4 or for pre-mounting the individual channels or fasteners to the chiller structure.

Figure 15:
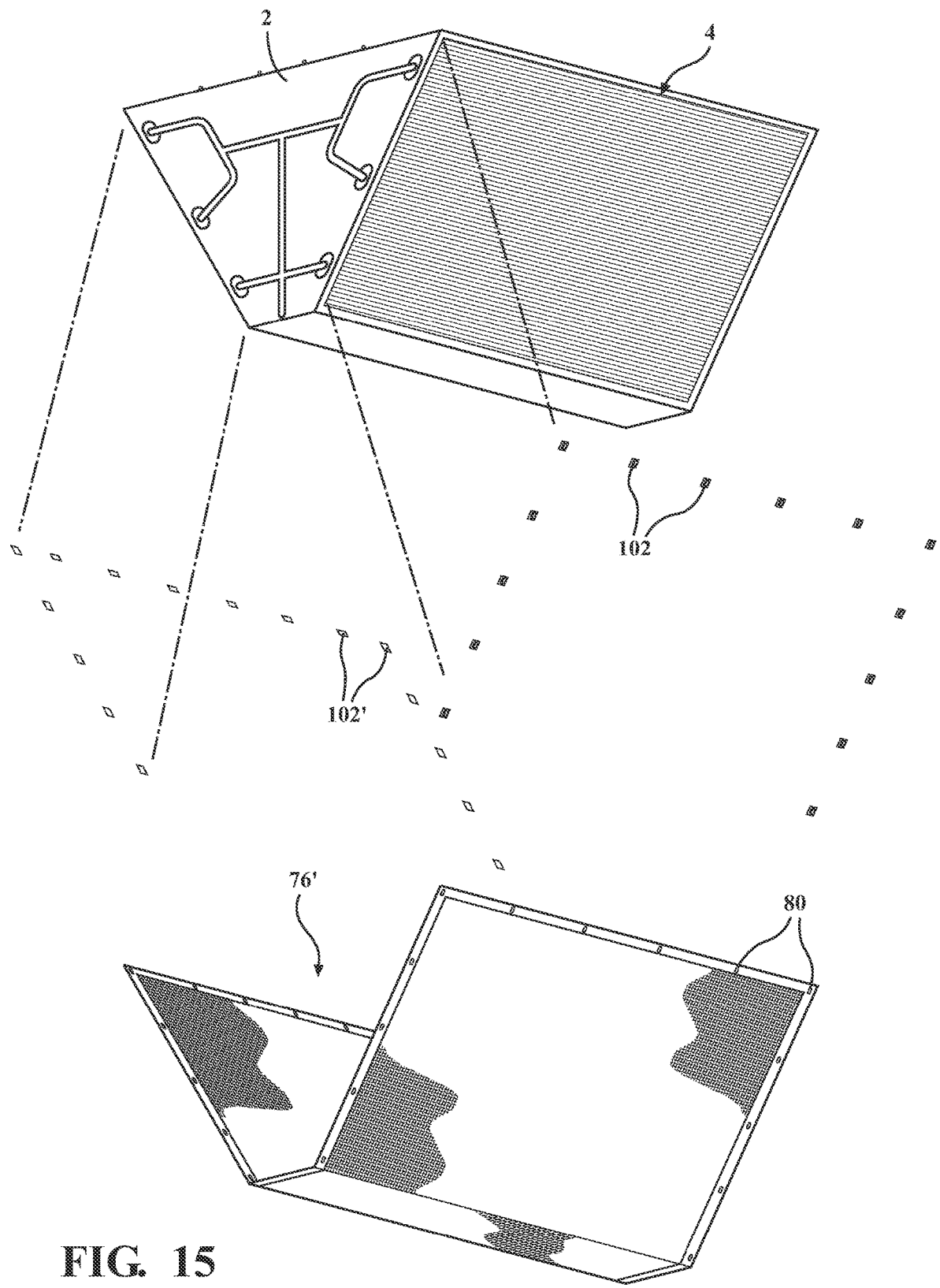
FIG. 15 is an exploded view of an alternate variant to FIG. 14 and depicting the wrap-around filter affixed directly to the angled chiller faces via twist or toggle lock fasteners which can include any of adhesives, magnets, hook and loop portions or traditional mechanical fasteners for pre-mounting the fasteners to the V chiller intake faces surrounding the openings.

FIG. 15 is an exploded view of an alternate variant to FIG. 14 and depicting the wrap-around filter 76☐ affixed directly to the angled chiller faces via the twist or toggle lock fasteners (a first plurality of these again shown at 102 as well as a second reverse face attaching plurality of fasteners at 104). As previously described, any of adhesives, magnets, hook and loop portions or traditional mechanical fasteners can be employed for pre-mounting the fasteners to the V chiller intake faces surrounding the openings. In each of the examples of FIGS. 13-15, the tracks or fasteners are located along each of side and remote interconnecting edges, and in order to provide the desired fit and tensioning of the screen when installed in place.

Figure 16:
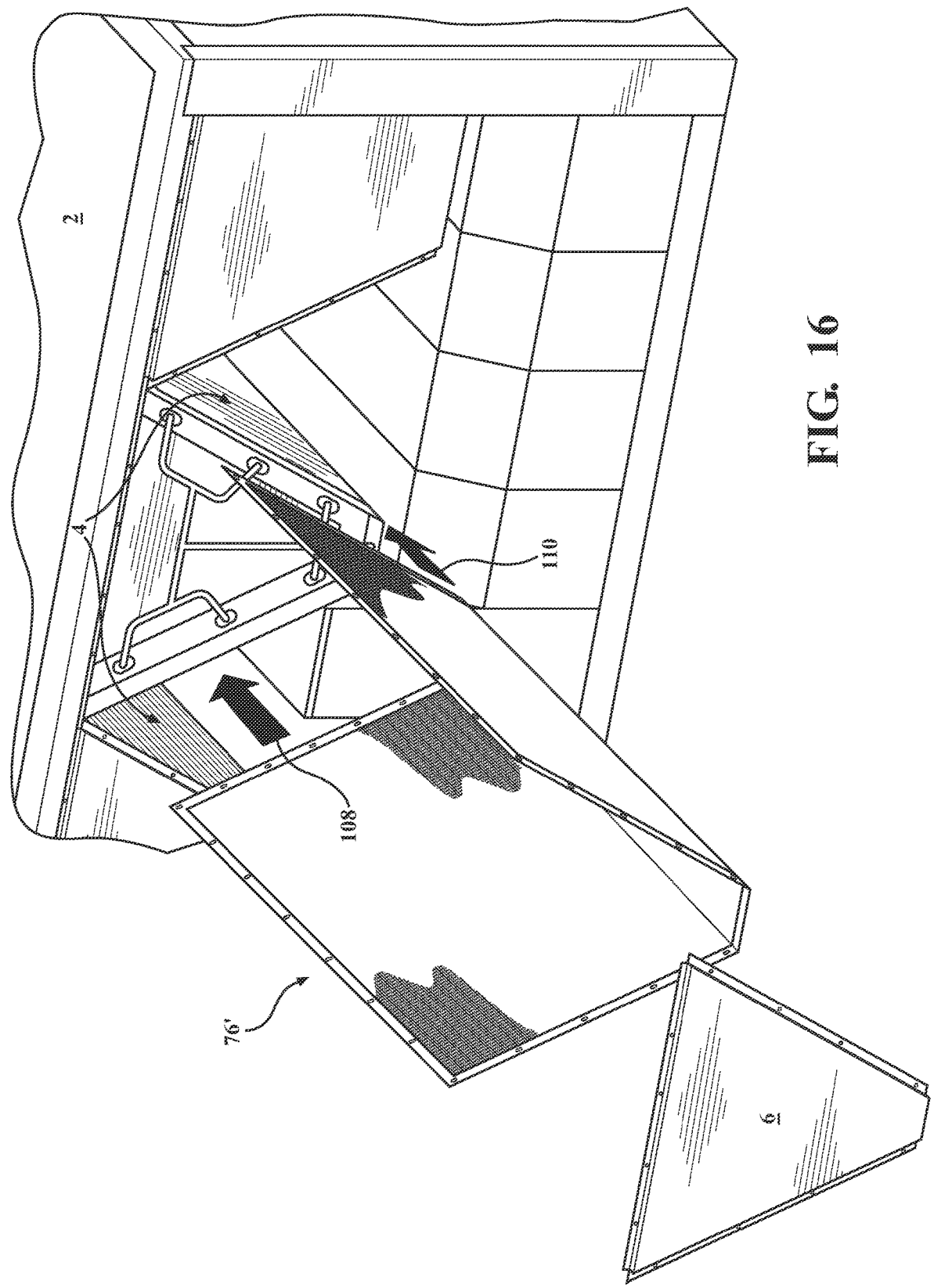
FIG. 16 is an environmental installation view of a further configuration of an alternate variant of wrap-around filter installed into a V chiller frame.

FIG. 16 is an environmental installation view of a further configuration of an alternate variant of wrap-around filter installed into a V chiller frame 2. This can include utilizing any of the installation scheme previously described in FIG. 6 et seq. in the original embodiment and by which the protective sheets 72 can be utilized to cover the intake faces 4 during installation of the wrap around screens in the direction of arrows 108 and 110, along with the use of the temporary clamps, adhesive or the like.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The invention claimed is:

1. A filter assembly for securing to an angled intake associated with a heat exchanger unit having coil arrays associated with the heat exchanger openings, said filter assembly comprising:
    a multi-sided assemblable frame including individual frame components, each of said frame components exhibiting a thin planar cross section;
    a multi-sided track including individual track sections secured to each of said frame components, said track sections each including an open facing slot within which are supported a plurality of screen fasteners including any of twist or toggle portions;
    apertures formed through edge proximate locations of each of said frame components and which, upon overlapping alignment, receiving additional fasteners for assembling said frame so that said track sections are interconnected to define a closed perimeter;
    a screen approximating in dimension an outline of said assembled track, said screen including a reinforced edge within which is configured a plurality of spaced apart grommets aligning with and receiving therethrough said twist or toggle portions of said adjustable screen fasteners extending through said slots of said interconnecting track sections in order to secure said screen to said track and frame; and
    upon positioning said thin planar frame with said attached screen against a perimeter defined outer flange surface surrounding the angled coil opening of the unit, a plurality of clips adapted to engage aligning edges of said assembled frame to the flange surface in order to secure said frame, track and screen in place over the heat exchanger opening, without the requirement of conventional screw fasteners, thereby avoiding risk of puncturing the coil arrays.

2. The filter assembly as described in claim 1, further comprising a plurality of clamps for temporarily securing together said aligning edges of said frame and the flange surface surrounding the intake opening prior to installation of clips.

3. The filter assembly as described in claim 1, said additional fasteners for assembling said frame components further comprising rivets.

4. A filter assembly for securing to first and second consecutively positioned and angled intake faces of a heat exchanger unit having coil arrays, the intake faces each having an outer flange surface surrounding a central opening, along with an intermediate interconnecting surface, said filter assembly comprising:
    first and second three-sided tracks adapted to being secured to the outer flange surfaces of the first and second consecutively positioned and angled intake faces;
    a flexible screen having a reinforced edge through which are formed perimeter spaced and grommet defining apertures, said screen approximating in dimension a combined area of each of the first and second angled intake faces, along with an additional area equaling the intermediate interconnecting surface located between the intake faces;
    said first and second three-sided tracks each further comprising an open forward slot within which are supported a plurality of adjustable screen fasteners such that a rotatable twist or toggle lock portion of each screen fastener projects through said slot;
    a plurality of additional fasteners adapted to being supported upon the outer flange surfaces of each of the angled intake faces to cover the first and second intake faces with said three sided tracks and said screen and without the requirement of conventional screw fasteners, thereby avoiding risk of puncturing the coil arrays.

5. The filter assembly of claim 4, each of said first and second three-sided tracks further comprising an overall "U" shape adapted to mount to each of extending side and remote interconnecting edges of the outer flange surfaces.

6. The filter assembly of claim 4, the heat exchanger unit further including an air cooled liquid chiller unit having coil arrays associated with the heat exchanger openings which are arrayed in an opposing "V" configuration.

7. The filter assembly of claim 4, said flexible screen further comprising intermediate cutout locations adapted to conform with a surface geometry of the heat exchanger unit.

8. The filter assembly of claim 4, further comprising any of adhesives, magnets or screws for affixing said fasteners to the outer flange surfaces.

9. A method for assembling and installing a filter assembly over an angled intake opening associated with a heat exchanger unit having coil arrays associated with the heat exchanger opening, comprising the steps of:
    providing a plurality of assemblable frame components, each of which exhibiting a thin planar cross section;

integrating a plurality of individual track sections into each of said assemblable frame components, the track sections each including an open forward slot;

slidably installing a plurality of screen fasteners through open ends of each of said track sections so that upper twist or toggle engaging portions of said screen fasteners project through said slots;

overlapping aligning apertures formed through edge proximate locations of said assemblable frame components and installing rivets through said apertures in order to construct a multi-sided frame in which the track sections are interconnected to define a closed perimeter;

providing a screen approximating in dimension an outline of the closed perimeter of the track, the screen including a reinforced edge within which is configured a plurality of spaced apart grommets aligning with and receiving therethrough the engaging portions of said screen fasteners extending through said slot to secure said screen to said track and frame;

positioning the frame against an outer flange surface surrounding the heat exchanger opening; and attaching a plurality of clips adapted to engage aligning edges of the frame to the flange surface in order to secure the frame, track and screen in place over the heat exchanger opening without the requirement of conventional screw fasteners, thereby avoiding risk of puncturing the coil arrays.

10. The method as described in claim 9, further comprising providing a plurality of clamps for temporarily securing together the aligning edges of the frame and intake opening prior to installation of the clips.

11. The method as described in claim 9, further comprising providing a protective layer approximating the dimensions of the assembled frame over a plurality of coils exposed by the intake opening and prior to installation of the assembled frame, track and screen.

12. The method as described in claim 11, further comprising configuring the protective layer as any corrugated or other semi-rigid or rigid material not limited to a heavy duty paperboard.

13. The method as described 11, further comprising applying a temporary adhesive to secure the protective sheet over the heat exchanger opening and in order to shield the coils of the chiller during installation of the frame.

* * * * *